A. C. E. RATEAU.
SUBMARINE MINE OR TORPEDO.
APPLICATION FILED MAY 27, 1913.
1,169,567.
Patented Jan. 25, 1916.
5 SHEETS—SHEET 1.
Fig.1
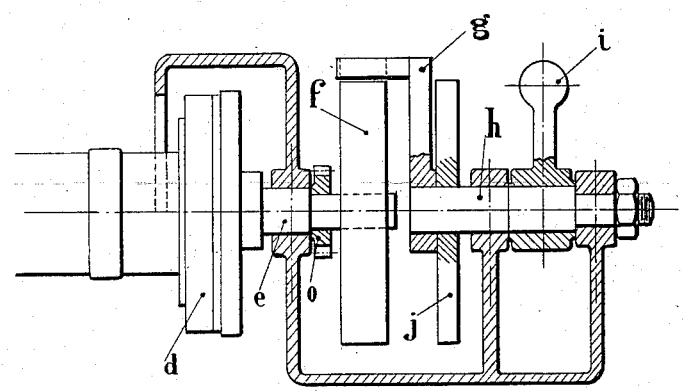
Fig.1ᵃ
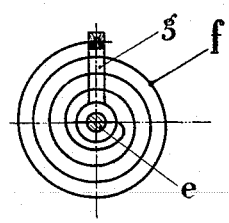
Fig.2
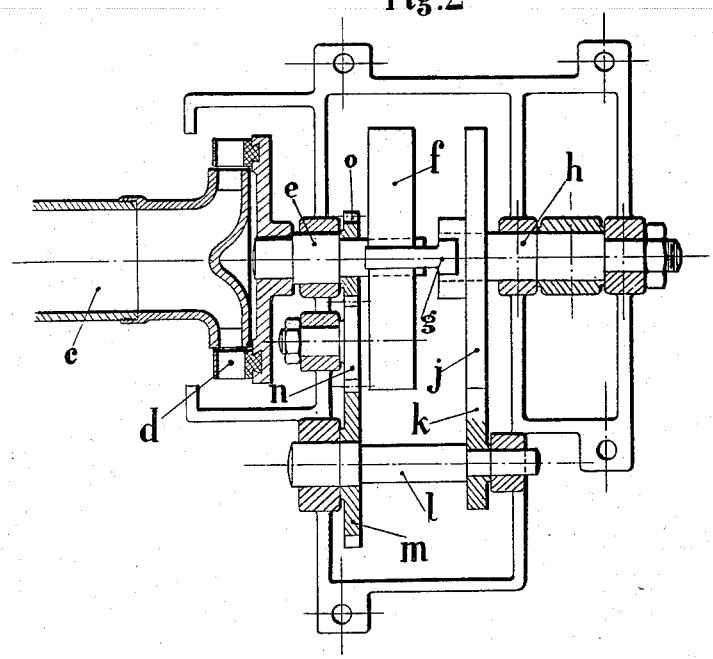
Fig.4
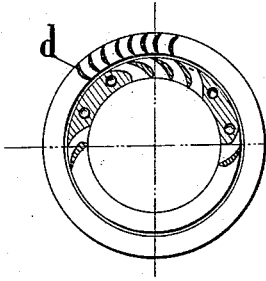
WITNESSES:
George Du Bon
M. H. Lockwood
INVENTOR
Auguste C. E. Rateau
BY
Biesent Knauth
ATTORNEYS

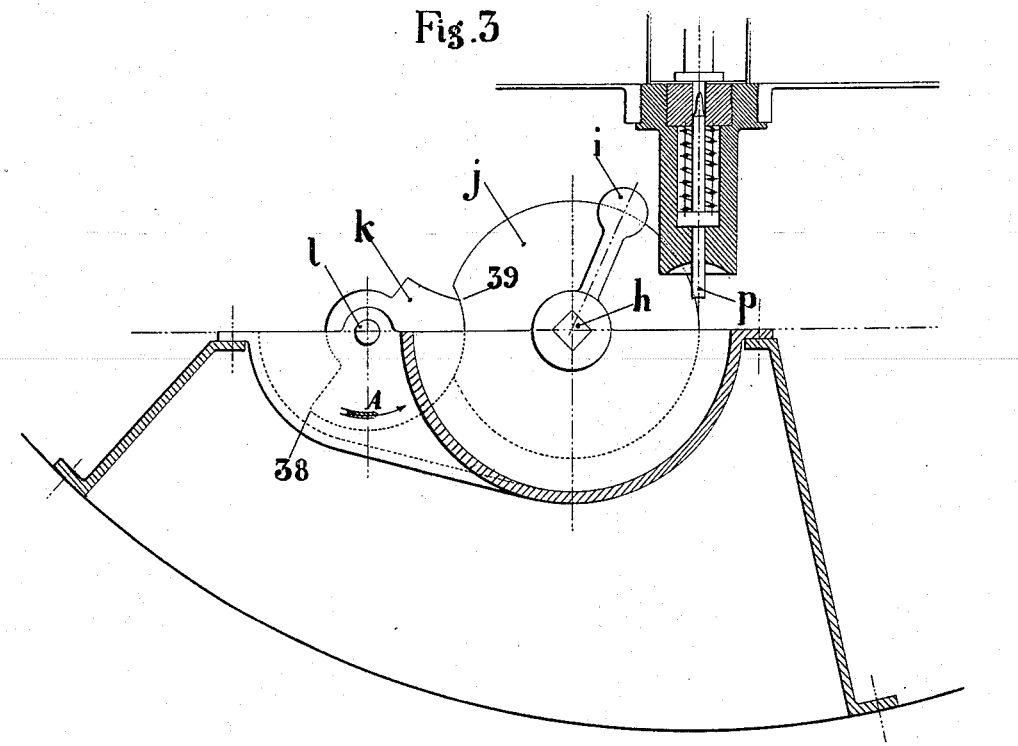
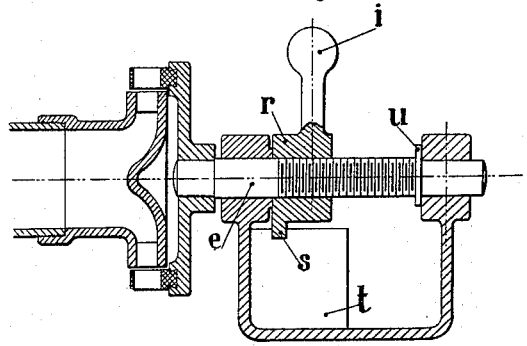
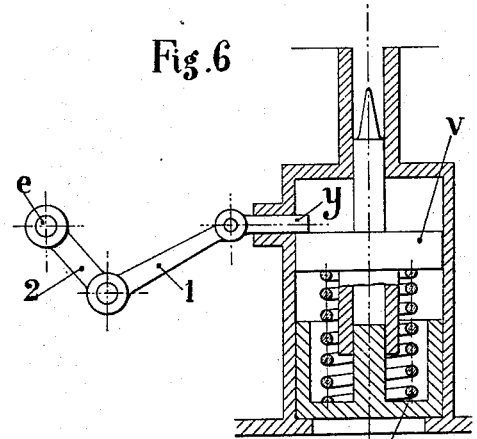

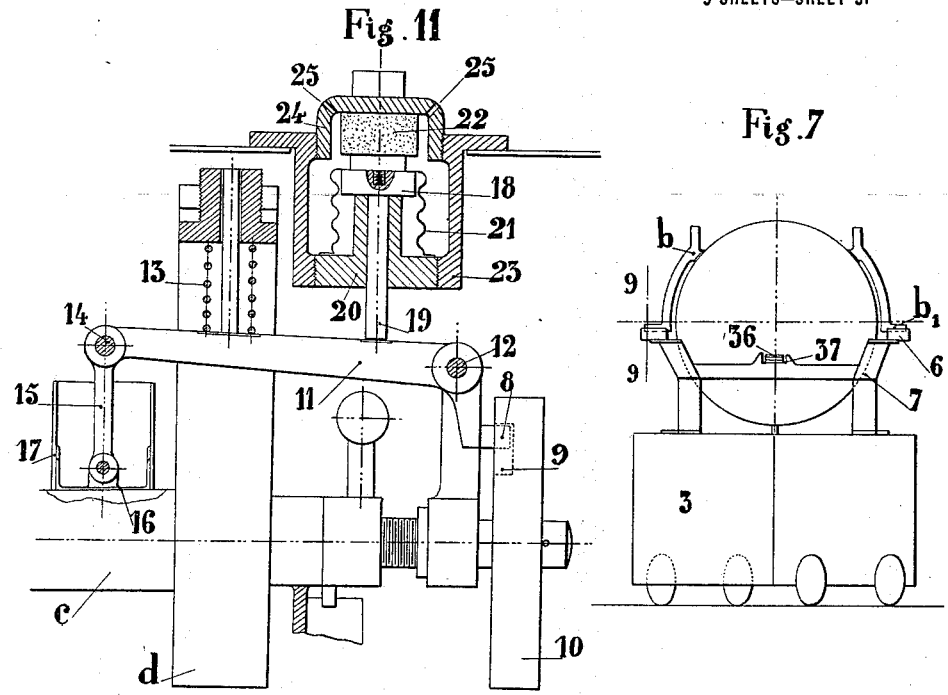
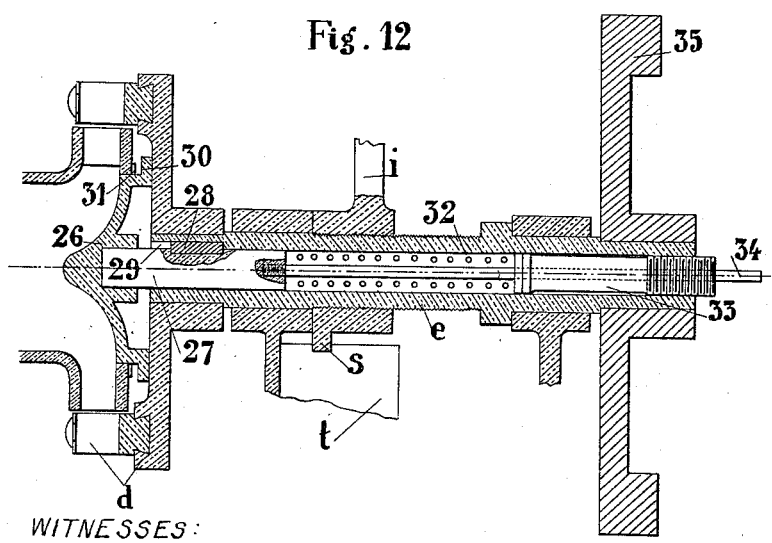

A. C. E. RATEAU.
SUBMARINE MINE OR TORPEDO.
APPLICATION FILED MAY 27, 1913.

1,169,567.

Patented Jan. 25, 1916.
5 SHEETS—SHEET 4.

WITNESSES:
George Du Bon

INVENTOR
Auguste C. E. Rateau
BY
Biesen & Knauth
ATTORNEYS

A. C. E. RATEAU.
SUBMARINE MINE OR TORPEDO.
APPLICATION FILED MAY 27, 1913.

1,169,567.

Patented Jan. 25, 1916.
5 SHEETS—SHEET 5.

WITNESSES:
George Du Bon
N. H. Lockwood

INVENTOR
Auguste C. E. Rateau
BY
Briesen & Knauth
ATTORNEYS

UNITED STATES PATENT OFFICE.

AUGUSTE C. E. RATEAU, OF PARIS, FRANCE.

SUBMARINE MINE OR TORPEDO.

1,169,567.  Specification of Letters Patent.  Patented Jan. 25, 1916.

Application filed May 27, 1913. Serial No. 770,100.

*To all whom it may concern:*

Be it known that I, AUGUSTE C. E. RATEAU, a citizen of the French Republic, residing at 7 Rue de Madrid, Paris, France, have invented certain new and useful Improvements in Submarine Mines or Torpedoes, of which the following is a specification.

This invention relates to means for the firing of submarine mines or torpedoes and consists of putting into action a turbine by the entering of water in the interior of the mine, after the opening, through collision, of apertures provided on the shell of the mine.

Figure 13:
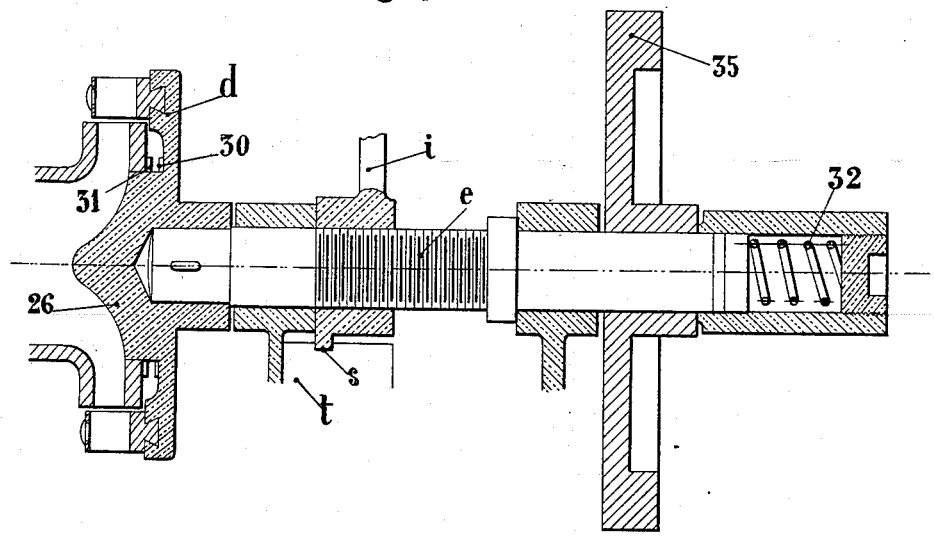
Figure 8:
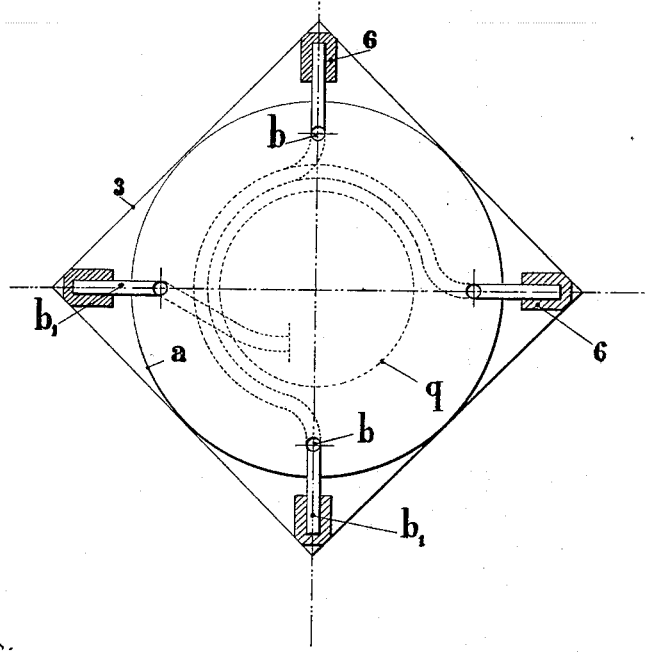
Figure 14:
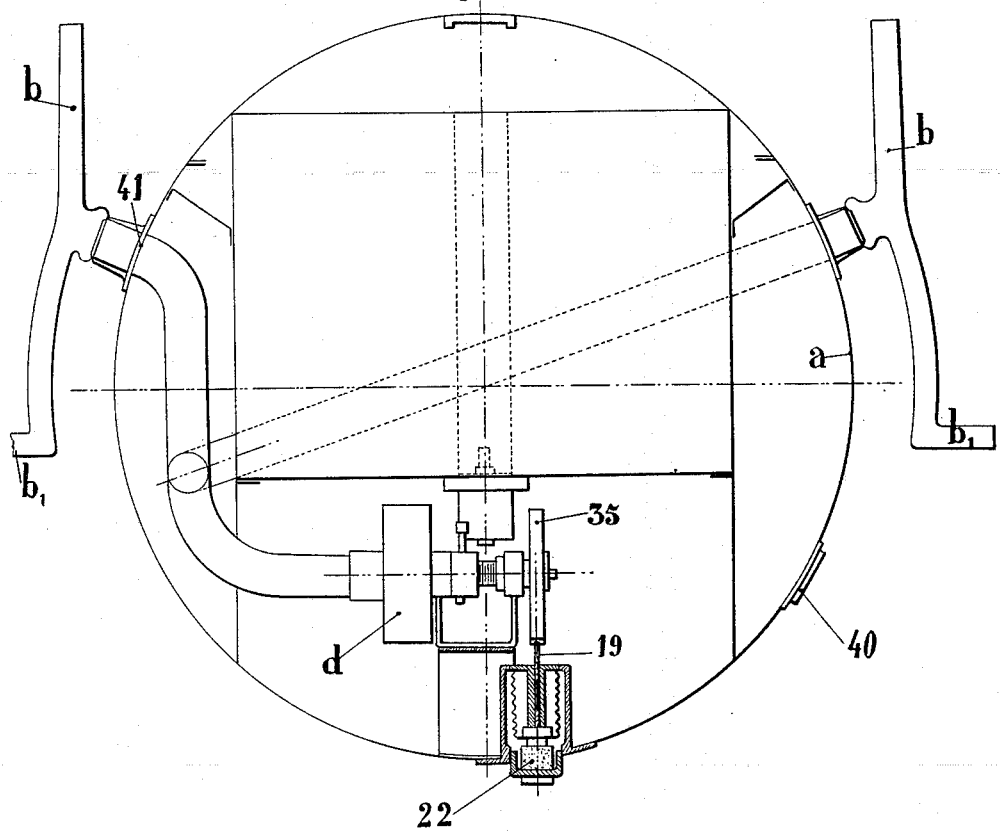
Figure 10:
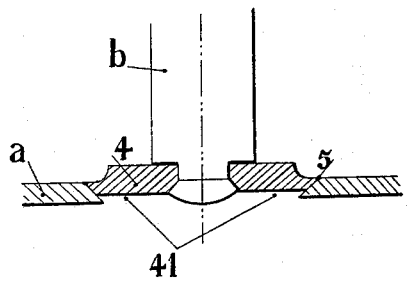

In the accompanying drawings which show, by way of examples, means embodying the invention:—Figure 1. is an elevation; Fig. 1ª shows the spring connected with the motor; Fig. 2. a plan view; and Fig. 3. a cross section of an arrangement for operating the firing mechanism; Fig. 4. is a cross section of the turbine; Fig. 5. illustrates another embodiment of the arrangement; Fig. 6. illustrates a further embodiment comprising a locking mechanism; Fig. 7. is a view of the complete mine; and Fig. 8. is a top view of Fig. 7; Fig. 9. is a detailed sectional view on line 9—9 of Fig. 7, showing the arrangement of the lateral arms for the opening of the apertures by shock; Fig. 10 shows means for fixing the arms to the shell of the mine. Fig. 11 is a vertical section through the axle of the turbine of an immobilizing arrangement with the aid of a piston submitted to pressure, and shows, furthermore, a safety device. Fig. 12 is a horizontal axial section of an arrangement in which the bottom of the distributer of the turbine is utilized as a piston. Fig. 13 shows a modified construction and Fig. 14 is an interior view of the shell.

Projecting on the outside of the shell of the mine (Figs. 7 and 14.) are arms or poles $b$ from which start pipes $c$ disposed inside the body of the mine and leading to a turbine $d$ or any dynamic receptor. The turbine $d$ is connected to a shaft $e$ (Figs. 1. and 2) either direct or through a gearing giving the desired reduction in speed. To this shaft is fixed one end of a spiral or other spring $f$ (Fig. 1ª) the other end being attached to a crank $g$ keyed to the shaft $h$ of the percussion hammer $i$. The connecting of both ends of the spring, one to the shaft $e$ and the other to the shaft $h$, can be effected in any other suitable manner. A shaft $l$ parallel to the shaft $e$ is adapted to turn in the same direction as the latter. Its rotation is obtained by means of three pinions $m\ n\ o$; the radius of these is preferably such that the speed of shaft $l$ is less than that of shaft $e$. A disk $j$ is keyed to shaft $h$ and is provided with a portion cut away along an arc concentric with the shaft $l$. A disk member $k$ is keyed to shaft $l$ and has a radius equal to that of the cut-away portion in the disk $j$. It will be seen that the member $k$ normally retains the disk $j$ and thereby prevents the rotation of shaft $h$. But when shaft $l$ has rotated over an angle measured by the arc 38—39 (Fig. 3) in the direction of the arrow A, the member $k$ escapes from the cut-away portion of disk $j$, and the latter is free to rotate, and consequently also the shaft $h$.

The operation is as follows:—When a vessel runs foul of one of the projecting arms $b$, a breaking is caused, the water penetrates into the mine by the pipes $c$ and causes the turbine $d$ to rotate and consequently also the shaft $e$. The movement of this shaft stretches the spring $f$ between the rotating shaft $e$ and the shaft $h$ which is prevented from turning so long as the disk $j$ is engaged with the member $k$. But the latter starts simultaneously to turn, through the movement of the shaft $e$ which is conveyed to it by the pinions $m\ n\ o$. At a given moment, when the shaft $e$ has turned sufficiently, the member $k$ releases the disk $j$, the shaft $h$ is thus free to rotate and the spring $f$, which has been sufficiently stretched, now slackens suddenly and causes the rotation of said shaft. The hammer $i$, carried by the shaft, is thereby hurled against the percussion mechanism (Fig. 3.) of the priming of the mine. This mechanism, which may be of any known type, sets fire to the explosive load $q$ (Fig. 7.) The air, which was imprisoned in the inside of the mine, at the moment of its closing, is at atmospheric pressure, so that the entering of the water into the mine, after the breaking of the projecting arm, takes place by the pressure of the water head above the turbine (disregarding the variations of the atmospheric pressure); the turbine is urged to rotate, up to the moment when the equilibrium of the pressure is established between the inside and the outside.

For the firing mechanism to operate, it is necessary that the energy developed by the turbine should be sufficient and, consequently that the difference between the outside pressure and the inside pressure should be greater than a certain minimum dependent on the sensitiveness of the detonator. The mine must therefore be submerged beyond a certain depth for the firing to be produced. One will increase the water head over the turbine, and one will decrease as much the depth of immersion necessary, by placing the turbine in the lower part of the mine. It is also possible to secure the firing by a less deep immersion, by producing a previous rarefaction in the interior of the mine. This rarefaction is obtained, for example, by withdrawing the inside air with a hand pump, like an automobile pump, before water-tight closing of the mine.

When the mine is in the air, the opening of the outside apertures can only produce the entering of air inside the mine through the turbine. But seeing the great speed of the flow of the air, and the small volume of it which passes through the turbine, the equilibrium of the pressure will be realized in a much shorter time than with the water, in practice in a fraction of a second. By reason of the very small specific weight of the air, the impulsion communicated to the turbine during this very short time will be very small and, in consequence, insufficient for the firing to take place. So that this impulsion should be sufficient to permit the turbine to operate the impulsion mechanism, it would be necessary to have inside the mine a rarefaction much greater than that which will be put into practice or which can be produced naturally. One is thus certain that the firing of the mine will not take place in the air. On the contrary, when the entering of water is possible, the specific weight of the water being very much more than that of the air, the firing will take place. One has therefore a great margin of security.

When the mine floats on the surface of the water, the apertures produced by the breaking of the arms $b$ are above the waterline. Consequently, their opening can only cause an introduction of air incapable of starting the turbine, as has just been set forth. On the other hand, the turbine being balanced, it is impossible to cause it to revolve by the displacing of the whole: the mechanism is therefore insensible to the explosion of neighboring mines, or to shocks from moorings, maneuvers or any accidental cause.

The mechanism for releasing the hammer and the gearing for transmitting the movement to said mechanism have been indicated only as an example, and it is evident that the most various mechanical arrangements can be adopted.

Thus in the embodiment of Fig. 5 the shaft $e$ of the turbine is screw threaded. Upon this shaft a nut $r$ works bearing the hammer $i$ and provided with a finger $s$, retained by a catch $t$ of appropriate length. In this way, the nut can only be displaced lengthwise during the first turns of the turbine. At the moment, when the nut gets loose, it comes up against a shoulder piece $u$ of the shaft and is suddenly carried away by the latter in its rotation, the hammer striking the percussion mechanism. In this arrangement, the *vis viva* acquired by the rotor of the turbine, is utilized to produce the shock. This arrangement permits of adjusting at will the time that elapses between the striking of the arms $b$ on the vessel's keel and the explosion of the mine. Said time depends on the distance that the nut $r$ must run before being carried away by the shaft $e$ in its rotation. It is therefore sufficient to modify the initial position of the nut $r$ so as to change the worth of the delay of firing. A delay varying up to 3, 4 and even 10 seconds can thus be obtained.

As vessels strike the mine ahead, the explosion can be adjusted in such a manner that it occurs when the stern of the vessel passes over the mine. The damage caused by the explosion will then be more considerable as it occurs in a part where the propelling members are located.

The rotation of the turbine can also be utilized to release a locking device which withholds the setting into action of any firing mechanism, cocked either by hand before the mooring of the mine, or at the moment when the mine is submerged or at the moment itself of the shock. This action is obtained either by a hydrostatic piston, or by traction of the buoy-rope, or by any other means. Fig. 6 shows a constructional form of this arrangement with firing mechanism governed by a hydrostatic piston.

When the mine is submerged, the pressure of the water compresses, by the medium of the piston $v$, the spring $x$ of the percussion mechanism and cocks it. The latter is locked by finger $y$ connected with the turbine shaft $e$ by any suitable mechanism, such as a crank and a connecting rod 1.2 (Fig. 6.) or an eccentric. When the turbine is put into motion, the finger $y$ releases the piston $v$ and the firing takes place.

Fig. 7 shows a suitable arranging of the mine as a whole, the turbine $d$ being placed in the lower part to increase the head of the water, as has been said. Below the mine is placed the anchoring device 3 which is seen more clearly in Fig. 7 and in the plan view of Fig. 8; at the time of immersion, the anchoring device connected by a cable to the body of the mine, gets detached, and falls to the bottom in the usual manner.

Fig. 10 indicates an advantageous constructional form of the poles or arms $b$. They are connected to the sheet iron forming the shell of the mine, by means of a plate 4 soldered over all its rim at 5 to the shell $a$. The arm $b$ is riveted to the plate 4. When this arm is struck by a ship, the solder of the plate 4 is torn away, and the aperture 41 is opened. The arms $b^1$ can be placed, preferably, like those in Figs. 7, 8, 9 and 14, with a view of assuring the opening of the apertures whatever be the inclination of the mine compared with that of the keel of the ship which strikes it. The vertical arms $b$ will operate when the mine is struck by the bottom of a vessel, and the side arms $b^1$ when it is struck by the side of the ship, even if the mine is inclined by the tide. The apertures 41 are placed in such a way than when the mine floats on the surface, these appertures are above the waterline of the mine, so as not to allow the entrance of water, should the mine be struck by a vessel. To protect these arms against accidental shocks, when mooring for instance, the arrangements indicated in Figs. 7, 8 and 9 may be adopted. The arms $b^1$ are placed in the diagonal planes of the anchoring device 3, so that they should be inside the perimeter of the latter. They are protected by guards 6 connected to the standard 7 of the mine which is fixed to the anchoring device. To prevent the mine from turning upon its standard, which would occasion the opening of the apertures, the mine may be provided with a stop 36 lodged in a notch 37 of the standard 7 as shown in Fig. 7. It will then be necessary furthermore to place the mine in such a position that the arms are set in the diagonal planes of the support.

The arrangements described have the advantage of assuring the operation of the mine at the required moment and preventing any untimely firing. They avoid the employment of any safety apparatus whose efficiency is always uncertain.

The turbine adopted can be of any known type and can have any other arrangement than that indicated in section on Fig. 4.: it can comprise any number of wheels and any desirable kind of injection, total or partial, radial or tangential. Instead of a turbine, one can have also any apparatus able to be put into action by the dynamic action of water.

With the above arrangements, it is impossible to start the turbine by the simple displacement of the mine, and to give it thus a rotary speed sufficient to bring about the firing. It would however still be possible to produce thus a slight angular displacement of the turbine, so that after a series of shocks or of manipulations of the engine, the turbine would undergo, in the end, an angular displacement of a few revolutions. This rotation would be especially to be feared with the embodiment of Fig. 5, having a hammer carried along at first lengthwise and then circularly, if nothing prevented the movement of the turbine. The number of revolutions the turbine must make to throw the hammer against the percussion mechanism would be thus diminished, and the *vis viva* of the rotor at the moment of the shock would not be sufficient to produce the firing of the charge. The result would be that failures in firing would have to be feared. In order to avoid this inconvenience, an arrangement such as shown in Figs. 11, and 12, may be adopted, which is characterized by the fact that the dynamic receptor, a turbine in general, is retained by an immobilizing mechanism which is released by a member operated by the outside pressure at the time of the breaking of the firing appendages of the mine.

In the arrangement of Fig. 11, the immobilizing mechanism is constituted by a finger 8 engaging a mortise 9 of the fly-wheel 10 mounted upon the shaft of the turbine $d$. Several mortises can be provided in the fly-wheel 10, instead of one only. The finger 8 is attached to a crank lever 11 which is movable about an axle 12 fixed to the framework of the apparatus. A spring 13 tends to push the lever 12 downward in the arrangement of the figure. The lever 11 is pivoted at 14 to a connecting rod 15 connected with a piston 16 which works in a cylinder 17 carried by the pipe $c$ conveying the water to the turbine $d$.

In normal times, that is to say when the apertures of access to the mine are shut, the piston 16 receives no thrust, and the spring 13, pressing upon the lever 11, sets the finger 8 into the mortise 9. The turbine is thus immobilized. But when the outside fluid, water or air, penetrates into the pipe $c$, if the pressure exceeds by a given amount, that which exists in the inside of the mine, the piston 16 is raised and disengages the finger 8, which releases the turbine.

The nature of the member operated by the pressure as well as the mechanism to retain and release the turbine can of course vary to a large extent. Thus, Fig. 12 represents an embodiment in which the member operated by the fluid pressure is the bottom 26 of the distributer of the turbine $d$. This bottom is mounted upon a shaft 27 passing inside the turbine shaft $e$. Shafts 27 and $e$ work together jointly in their rotating movements, but shaft 27 can assume a longitudinal displacement relatively to shaft $e$ owing to a key 28 which slides in a groove 29 of shaft $e$ or by any other suitable means.

The movable bottom 26 of the distributer carries teeth 30 adapted to engage teeth 31 belonging to the stationary part of the distributer. A spring 32 located inside the shaft *e* and whose tension can be regulated by means of the nut 33 rests against shaft 27. In ordinary times, the spring 32 pushes shaft 27 and engages the teeth 30 with teeth 31. As the turbine shaft works jointly, as regards rotation, with shaft 27, any movement of the turbine is then impossible. When the fluid flows through the turbine, its thrust upon bottom 26 displaces the latter to the right (as shown in Fig. 12) the teeth 30 and 31 are no longer engaged, the turbine is free to rotate.

A screw threaded rod 34, at the end of shaft 27, and traversing freely the nut 33 allows of releasing the turbine and turning the fly-wheel to cock again the apparatus. The rod 34 can be introduced into the mine through a stopper 40, on the shell (Fig. 14). By this means the nut *r* can also be given the displacement required to adjust the delay of firing as stated above. The bottom 26 can also be constructed so as to be integral with wheel *d* as shown in Fig. 13, the shafts *e* and 27 forming then one single shaft which, in normal times, is pushed by an outside spring 32 so that the teeth 30 and 31 interlock as previously. When the fluid acts upon the bottom 26, the latter as well as the wheel is pushed toward the right, and the wheel is then free to rotate.

In one or other of the embodiments, it is possible to add to the mechanism described an arrangement for preventing the mine from being offensive during a certain time after its mooring. This arrangement comprises, for example, a piston 18 whose stem 19 is guided by the bushing 20 and which a spring 21, formed advantageously by a metallic water-tight accordeon, tends to lift up. Above the piston 18, is placed a cylinder of soluble matter 22 which is maintained in box 23 by a screw threaded cup 24 provided with ports 25.

Before the mooring of the mine, the cylinder 22 compresses the piston 18 and maintains its stem 19 against the lever 11 which immobilizes thus the turbine. When the mine is submerged, the water is introduced in the inside of the cup through the ports 25 and dissolves the cylinder 22 at the end of a certain time. The spring 21 then raises the piston 18 and releases the lever 11. Owing to this arrangement, if the outside arms break during mooring, the water is introduced in the inside of the mine through the turbine, but the latter being immobilized, cannot revolve, and the firing does not take place.

In the embodiment of Fig. 12, the same arrangement can be adopted. It suffices to cause the stem 19 of the piston to bear on any point of the fly-wheel 35 (Fig. 12) or engage a notch in said fly-wheel.

Fig. 14 shows a general arrangement of the mine comprising, by way of example, the firing device of Fig. 5 and the locking device of Fig. 12 which is provided with a cylinder of soluble matter of the kind shown in Fig. 11, having its stem 19 adapted to engage the fly-wheel 35 of the turbine as in Fig. 12.

The invention is applicable to mines or torpedoes of any sort.

What I claim is:—

1. In a submarine mine, firing means including a turbine adapted to be operated by water and means for introducing water into the mine and conducting it to said turbine.

2. In a submarine mine, firing means adapted to be operated by the introduction of water, means for conducting the water to said firing means, said mine being sealed and the pressure therein reduced below the normal atmospheric pressure.

3. In a submarine mine, firing means including a turbine adapted to be operated by water introduced thereto through suitable conduits, a percussion device and intermediate gear mechanism between said turbine and the percussion device adapted to control the operation of the latter.

4. In a submarine mine, firing means including a turbine adapted to be operated by water, conduits within the mine for conducting water to said turbine and means for introducing water to said conduits.

5. In a submarine mine, firing means including a turbine adapted to be operated by water, means for introducing water into said mine and for conducting it to said turbine and supporting means connected with said last named means.

6. In a submarine mine, firing means including a turbine for positively operating the same adapted to be operated by water introduced into the mine and means for preventing premature rotation of the turbine adapted to be operated by the water entering the mine.

7. In a submarine mine, firing means including a turbine adapted to be operated by water, means for preventing premature rotation of the turbine, and means for releasing said turbines, operated by the pressure of the water when the same is introduced to operate the turbine.

8. In a submarine mine, firing means including a turbine adapted to be operated by water a casing therefor and means coöperating between the turbine and its casing to prevent operation of said turbine except upon the introduction of water under pressure.

9. In a submarine mine, a firing pin, a hammer for operating the same, a turbine for operating said hammer and means for preventing operation of the hammer until the lapse of a predetermined time after the turbine is started.

10. In a submarine mine, a firing pin, a hammer for operating the same, a turbine for operating said hammer, means for preventing operation of the hammer until the turbine has rotated a prearranged number of times and means for introducing water into the mine for releasing and operating said turbine.

In testimony whereof, I have hereunto set my hand at Paris, this sixteenth day of May 1913.

AUGUSTE C. E. RATEAU.

In the presence of two witnesses:
HANSON C. COXE,
ALBERT NUNÉS.

Copies of this patent may be obtained for five cents each, by addressing the "Commissioner of Patents, Washington, D. C."